June 9, 1964     D. B. PRICE     3,136,241
COFFEE MAKER WITH COMBINATION COVER

Filed Oct. 12, 1962     4 Sheets-Sheet 1

Fig. I.

WITNESSES:

INVENTOR
David B. Price
BY
ATTORNEY

June 9, 1964　　　　D. B. PRICE　　　　3,136,241
COFFEE MAKER WITH COMBINATION COVER
Filed Oct. 12, 1962　　　　　　　　　　4 Sheets-Sheet 3

June 9, 1964         D. B. PRICE         3,136,241
COFFEE MAKER WITH COMBINATION COVER
Filed Oct. 12, 1962                      4 Sheets-Sheet 4

3,136,241
COFFEE MAKER WITH COMBINATION COVER
David B. Price, Mansfield, Ohio, assignor to Westinghouse Electric Corporation, Pittsburgh, Pa., a corporation of Pennsylvania
Filed Oct. 12, 1962, Ser. No. 231,320
8 Claims. (Cl. 99—302)

This invention relates to beverage brewing devices and particularly to coffee making apparatus.

In a beverage brewing device, such as a coffee maker, it is necessary to provide a means for supporting the ground coffee or other brew-making ingredients during the brewing process. In prior art devices, such means has generally taken the form of a perforated basket which is adapted to receive brew-making ingredients through a top access opening. During the brewing process, the basket is supported in the brewing vessel with the access opening at the top of the basket while liquid is passed over and through the ingredients, thereby producing the brew.

On completion of the brewing, the ingredients are generally reduced to a saturated mass, and the necessity arises to remove this hot mass from the brewing vessel. To accomplish this task, the user is required to lift the perforated basket from the vessel and transfer it, with its open end up, to the place where the ingredients are to be emptied therefrom. On removal of the basket from the vessel, the liquid retained by the ingredients continues to drain through the perforations, causing the basket to drip during this transfer process. The present invention overcomes this objectionable dripping of liquid from the basket and thereby provides an improvement in the removal of the brew-making ingredients after the brewing process is completed.

It is therefore an object of this invention to provide a brew-making device having an improved ingredient-supporting container which may be transferred from the vessel to the place of disposal without dripping of liquid therefrom.

This object, and other objects which will become apparent as the description proceeds, are achieved by providing a novel cover assembly for a brew-making device such as a coffee maker. The cover assembly comprises a container member having a tubular wall closed by an upper wall and a removable closure member which serves to close the lower end of the container. When the container is inverted with the closure member removed, it is adapted to receive coffee or other brew-making ingredients through the open end. With the closure member put in place, the cover assembly may be positioned in the top opening of the brewing vessel, with the container adapted to substantially close the top opening.

After the brewing is completed, the used brewing ingredients are easily removed from the vessel by merely lifting the cover assembly from the vessel and immediately inverting the assembly to prevent dripping, after which the assembly may be carried to the place of ingredient disposal without the dripping of liquid, which may be hot.

For a better understanding of the invention, reference should be had to the accompanying drawings, in which.

Although the principles of the invention are broadly applicable to brew-making devices, the invention is usually employed in an electric coffee maker, and hence it has been so illustrated and will be so described.

Figure 1:
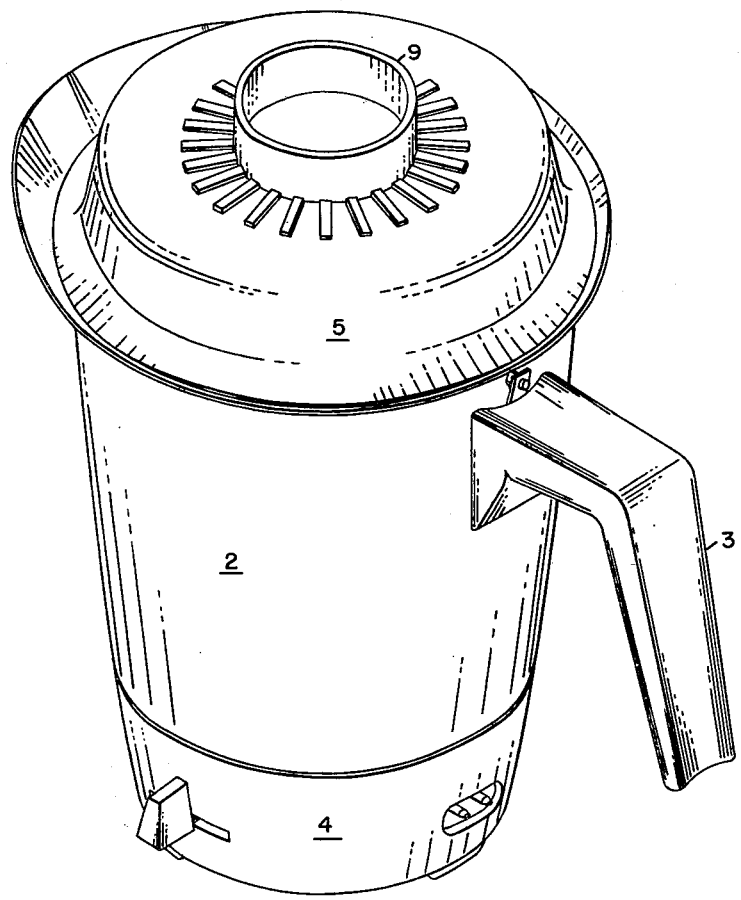
FIGURE 1 is a perspective view of a coffee maker having the invention incorporated therein.
Figures 3, 4, 8:
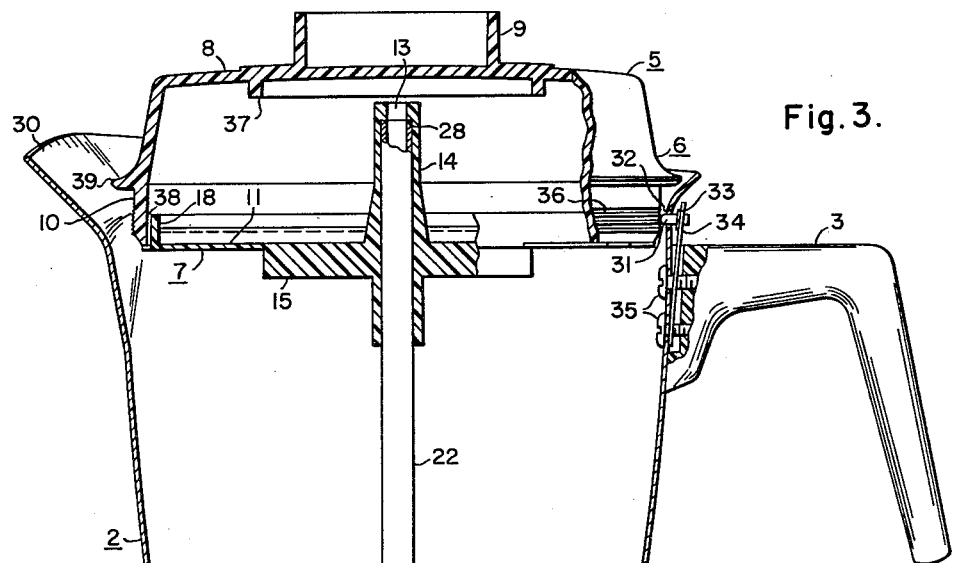
FIG. 3 is a vertical sectional view of the coffee maker having the cover assembly and pump tube assembled therein.
FIG. 4 is a partial plan view of the coffee maker having the cover assembly removed.
FIG. 8 is a fragmentary sectional view of the top portion of the coffee maker showing the container assembled therein, with the pump tube and closure member removed.

Referring to the drawings, especially FIG. 1, there is shown a coffee maker having a top opening vessel 2 for containing the liquid to be infused and provided with a handle 3 and an electric heating unit 4 of any suitable type. Disposed in the top opening of the vessel 2 is a cover assembly 5 which acts to substantially close the top opening and may be supported vertically by a pump tube 22, as best shown in FIG. 3.

Figure 2:
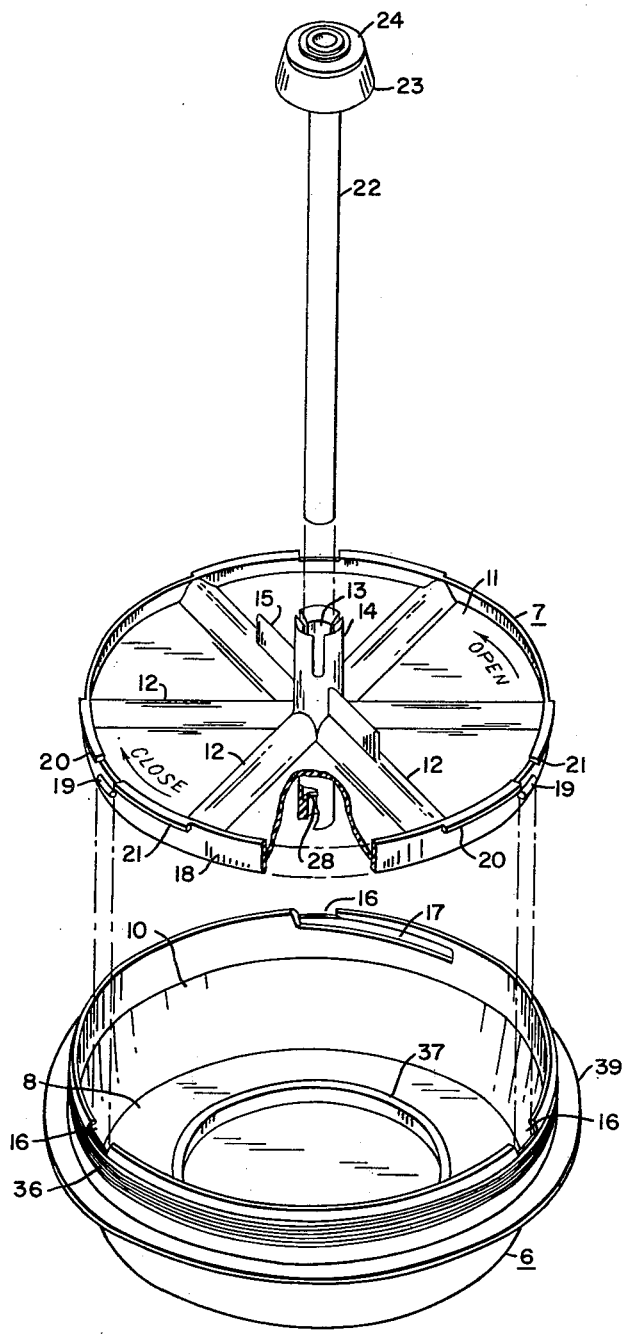
FIG. 2 is a perspective view showing the cover assembly and pump tube in the inverted position and disassembled.

Referring to FIG. 2, the cover assembly 5 comprises a container 6 having an open end and a closure member 7 which serves to close the open end.

The container 6 has a circular end wall 8 having a tubular handle 9, shown in FIG. 1, provided for grasping of the container during handling operations or as a supporting means when the container is rested thereon. A circular tubular wall 10 forms the opening in the container 6 and is of such a depth that a sufficient amount of ground coffee to make a brew may be held within the container without spillage, when the container is disposed as shown in FIG. 2.

The closure member 7 comprises a circular plate 11 having radial webs 12 provided for stiffening a tubular member 14 extending upwardly and downwardly from the plate and having a hole or passage 13 therethrough. A wing flange 15 is formed on a pair of radial webs 12, adjacent the tubular member 14, for grasping by the user when turning the closure member 7 in the container 6.

The container 6 and the closure member 7 are preferably fabricated from a heat resistant plastic material, such as polycarbonate or polypropolene.

Figure 5:
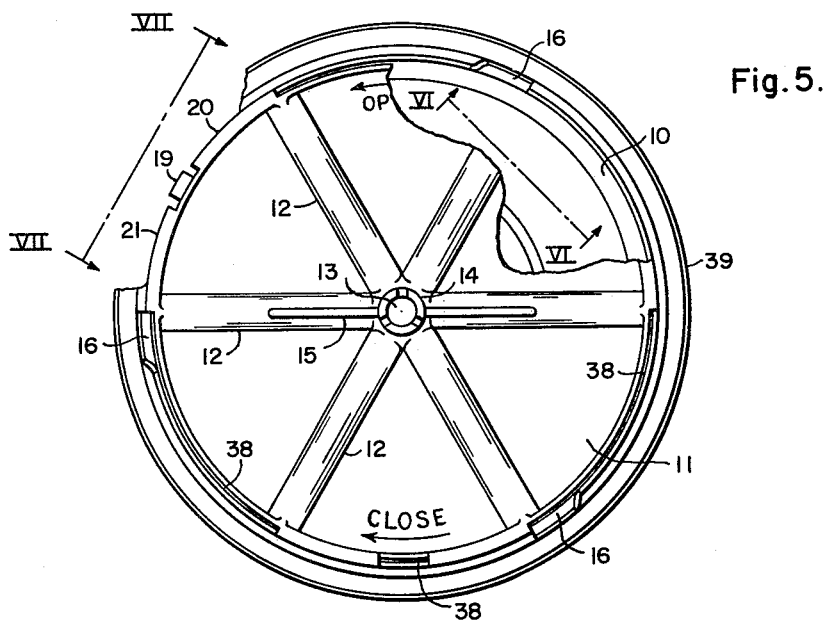
FIG. 5 is a plan view showing the cover assembly with portions of the closure member and container broken away.
Figure 6:
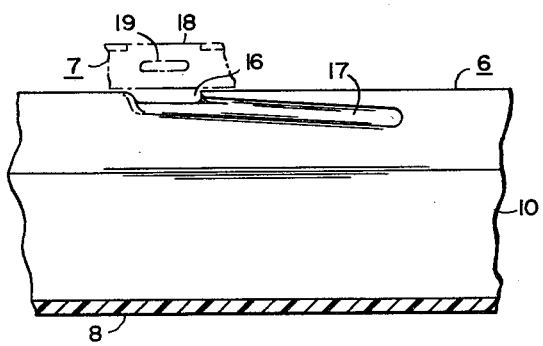
FIG. 6 is an enlarged fragmentary view taken on line VI—VI of FIG. 5.
Figure 7:
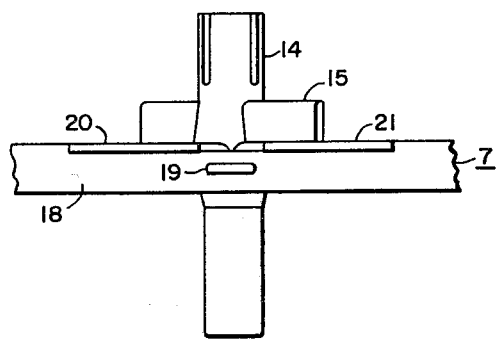
FIG. 7 is an enlarged fragmentary view taken on line VII—VII of FIG. 5.

The container 6 and the closure member 7 may be assembled by a twist lock arrangement as best shown in FIGS. 5, 6 and 7. Entry notches 16 and helical grooves 17 are located at three equally spaced points on the circumference of the inside surface of the tubular wall 10. The closure member 7 has a flange 18 disposed on its circumference, and a tab 19 and a pair of locking flanges, 20 and 21, are located at three equally spaced points on the periphery of the flange.

In assemblage of the closure member 7 on the container 6, each tab 19 is inserted into an entry notch 16 to register with a groove 17. When the closure member 7 is turned in clockwise direction, the tab 19 travels into the cover due to the slope of groove 17 as shown in FIG. 6. The closure member 7 is turned until the tab 19 reaches the end of the groove 17, at which point the closure member is retained in the container 6. The resultant movement of the closure member 7 into the container 6 also causes the locking flanges 20 and 21 to be forced into engagement with the edge of the tubular wall 10, thereby providing an added force to hold the closure member in place.

In FIG. 3, in which the coffee maker is shown assembled during the brewing process, the hole 13 receives the end of the pump tube 22 which is engaged in tubular member 14 by a friction fit.

The pump tube 22 has pump member 23 and a slidable disc 24 disposed at its lower end. The pump 23 and disc 24 are disposed in the opening of a pump well 25 formed in the bottom of the vessel 2. A pair of holes 26 in the pump 23 allow fluid to enter the pump well 25, from which it is pumped upwardly through the pump tube 22.

The pumping action of a steam-actuated pumping arrangement is not described here in detail as it does not comprise part of this invention, and, therefore, any suitable pumping arrangement may be used. However, details of the operation of an arrangement of this type are disclosed in U.S. Patent No. 2,798,143, to E. L. O'Brien, dated July 2, 1957, and assigned to the assignee of the present invention.

During the brewing process, the pump 23 and the pump tube 22 are supported by the shoulder 27 of the pump well 25 in the bottom of the vessel 2. The upper portion of pump tube 22 is inserted in the tubular flange 14 in contact with a shoulder 28 formed adjacent the upper end of the passage 13 (FIG. 3). The cover assembly 5 is thereby substantially supported by the pump tube 22, when positioned in the top opening of vessel 2, with the pump tube in place.

The cover assembly 5 is located in the top opening of vessel 2 by a pair of inwardly projecting buttons 29 fixed adjacent the pouring spout 30 (FIG. 4) and a spring-biased button 31 protruding through a hole 32, directly above the handle 3 (FIG. 3). The spring-biased button 31 has a circular flange 33 of greater diameter than the hole 32. The button 31 is fastened to a spring 34 by the tight engagement of the outer end of the button with a hole in the spring. The spring 34 is secured to the vessel 2 by screws 35 which also serve to fasten the handle 3 to the vessel. The clamping action of the handle 3 against the spring 34 causes the spring to be biased toward the vessel 2, thereby forcing the button 31 into the vessel. Grooves 36 are formed on the outer surface of the tubular wall 10 of the container 6, and are located for registry with the fixed buttons 29 and the spring-biased button 31.

*Operation*

When it is desired to make a fresh brew of coffee by employment of the present invention, the cover assembly 5 is removed from the vessel and disassembled. The container 6 is inverted, with the open end at the top, for receiving the ground coffee. The container handle 9 serves as a means of support should the inverted container be rested on a table or other surface. After placing the ground coffee in the cover 6, the closure member 7 is locked in position in the cover as previously described, and the pump tube 22 may be inserted in the tubular member 14. The desired quantity of water is placed in the vessel 2 and the cover assembly 5, including the pump 23 and pump tube 22, is then positioned in the container, as shown in FIG. 3, with the cover assembly resting on the pump tube. The heating unit 4 is then energized, and the brewing process begins.

During the brewing process, the heated fluid is pumped upwardly through the pump tube 22 and enters the cover assembly 5 through the hole 13. As the fluid is pumped into the cover assembly 5, it is forced against the end wall 8 of the container 6.

A downwardly-projecting circular flange 37 is provided on the inside of the end wall 8 of the cover for dispersing the fluid more evenly over the grounds.

Should the pressure of the fluid against the end wall 8 tend to lift the cover assembly 5, the engagement of the buttons 29 and 31 with the grooves 36 will hold the assembly in place.

After the liquid has become infused with the ground coffee, it is returned to the container through suitable discharge means provided in the cover assembly 5. Such discharge means preferably comprises suitable clearance between adjacent parts of the container 6 and the closure member 7. Such clearance may be provided around the entire periphery of the closure member, or in the regions adjacent the notches 16, or at both places. The closure member 7 itself is preferably, although not necessarily, imperforate. In the embodiment shown, the flange 18 is of a lesser diameter than the adjacent inner surface of the tubular wall 10 when the closure member 7 is locked into place. Since this clearance space is the only outlet from the container 6, all fluid pumped to the container must discharge therefrom through this clearance space 38.

During operation of the coffee maker, the pumping action produces a super-atmospheric pressure in the cover assembly 5. The differential pressure between the interior of the cover assembly 5 and the interior of the vessel 2 tends to force the liquid through the ground coffee to the discharge openings 38. The resulting brew of superior quality may be attributed to the forcing of liquid through the ground coffee caused by the aforementioned pressure, as distinguished from conventional percolator-type coffee makers, where the liquid moves through the coffee grounds by gravity only.

When the brewing process is completed, the cover assembly 5 is grasped by the cover handle 9, lifted from the vessel 2, and inverted while over the top opening, so that any drippage falls into the vessel. The cover assembly 5 may then be placed on a table with the handle 9 serving as a support, or transferred to the place of disposal for the used grounds, without dripping. The tube 22 and closure member 7 may then be removed, and the container 6 emptied.

As illustrated in FIG. 8, the container 6 may be used to close the vessel 2 after the closure member 7 has been removed. An outwardly-extending portion 39 is provided on the outer face of the tubular wall 14, and positioned such that it is above the vessel 2 when the cover assembly 5 is supported by the closure member 7 and the pump tube 22. When so positioned, the portion 39 serves to prevent liquid from splashing out of the container 2, around the periphery of the cover assembly 5. However, with the member 7 removed, the container 6 is allowed to enter the vessel 2 until the portion 39 contacts the vessel. The container 6 is then supported by the portion 39, with the buttons 29 and 31 contacting grooves 36 for locating the container in the top opening of the vessel 2, and to prevent accidental displacement of the container or cover 6 during pouring.

It will be apparent from the above description that this invention provides an improved brewing device, which facilitates removal of used brewing ingredients without the dripping of any liquid which may be retained therein, and which provides for pressure feed of liquid through the coffee grounds.

While the invention has been shown in but one form, it will be obvious to those skilled in the art that it is not so limited, but is susceptible of various changes and modifications without departing from the spirit thereof.

I claim as my invention:

1. A beverage brewing device comprising a vessel for liquid to be infused, said vessel having a top opening formed therein, and a cover assembly disposed in said opening and serving as a basket for brew-making ingredients, said assembly comprising a container having an imperforate tubular wall and a wall closing the upper end thereof, and a removable closure member disposed adjacent said tubular wall for closing the lower end of said tubular wall, the vertical extent of the periphery of said member being less than the vertical extent of said tubular wall, said closure member having an inlet formed therein for entry of liquid into said assembly, and said assembly having outlet means therein for discharging infused liquid therefrom;

said container being adapted to receive brew-making ingredients when in the inverted position, with said upper end lowermost, and said container substantially closing said top opening in said vessel when positioned upright therein.

2. A beverage brewing device comprising a vessel for liquid to be infused, said vessel having a top opening formed therein, and a cover assembly disposed in said opening and serving as a basket for brew-making ingredients, said assembly comprising, a container having a tubular wall and a wall closing the upper end thereof, and a removable closure member disposed adjacent said tubular wall for closing the lower end of said tubular wall, said closure member having an inlet formed therein for entry of liquid into said assembly, the periphery of said closure member being disposed in spaced relation to said tubular wall for discharge of infused liquid therebetween from said assembly;

said container being adapted to receive brew-making ingredients when in the inverted position, with said upper end lowermost, and substantially closing said vessel top opening when positioned upright therein.

3. A beverage brewing device comprising a vessel for liquid to be infused, said vessel having a top opening formed therein, and a cover assembly disposed in said opening and serving as a basket for brew-making ingredients, said assembly comprising a container having a tubular wall and a wall closing the upper end thereof, and a removable closure member disposed adjacent said tubular wall for closing the lower end of said tubular wall, the vertical extent of the periphery of said member being less than the vertical extent of said tubular wall, said closure member having an inlet formed therein for entry of liquid into said assembly, the periphery of said closure member being disposed in spaced relation to said tubular wall for discharge of infused liquid therebetween from said assembly;

said container being adapted to receive brew-making ingredients when in the inverted position, with said upper end lowermost, and substantially closing said vessel top opening when positioned upright therein.

4. A coffee brewing device comprising a vessel for liquid to be infused, said vessel having a top opening formed therein, pump means disposed in said vessel, a pump tube extending upwardly from said pump means and a cover assembly disposed in said opening and serving as a coffee basket, said assembly comprising a container having a tubular wall and a wall closing the upper end thereof, and a removable closure member disposed adjacent said tubular wall for closing the lower end of said tubular wall, said closure member having an opening formed therein for entry of liquid into said assembly, the periphery of said closure member being disposed in spaced relation to said tubular wall for discharge of infused liquid therebetween from said assembly, and a connecting flange extending from said opening for registry with said pump tube;

said container being adapted to receive coffee making ingredients when in the inverted position, with said upper end lowermost, and said container substantially closing said top opening in said vessel when positioned upright therein.

5. A coffee brewing device comprising a vessel for liquid to be infused, said vessel having a top opening formed therein, pump means disposed in said vessel, a pump tube extending upwardly from said pump means and a cover assembly disposed in said opening and serving as a coffee basket, said assembly comprising a container having a tubular wall and a wall closing the upper end thereof, an outwardly extending portion formed on said tubular wall and a removable imperforate closure member disposed adjacent said tubular wall for closing the lower end of said tubular wall, said closure member having an opening formed therein for entry of liquid into said assembly, the periphery of said closure member being disposed in spaced relation to said tubular wall for discharging infused liquid therebetween from said assembly, and a connecting flange extending from said opening for registry with said pump tube;

said container being adapted to receive coffee making ingredients when in the inverted position, with said upper end lowermost, and said container substantially closing said top opening in said vessel when positioned upright therein, said assembly being substantially supported by said pump tube during the coffee making process and said container being supported by registration of said outwardly extending flange with said vessel when either said closure member or said pump tube are removed from said vessel.

6. A beverage brewing device comprising a vessel for liquid to be infused, said vessel having a top opening formed therein, and a cover assembly disposed in said opening and serving as a basket for brew-making ingredients, said assembly comprising a container having a tubular wall and a wall closing the upper end thereof, and a removable closure member disposed adjacent said tubular wall for closing the lower end of said tubular wall, said closure member having an inlet formed therein for permitting entry of liquid into said assembly, and said assembly having a plurality of clearance openings provided between the periphery of said closure member and said tubular wall for discharging infused liquid therefrom;

said container being adapted to receive brew-making ingredients when in the inverted position, with said upper end lowermost, and said container substantially closing said top opening in said vessel when positioned upright therein.

7. A beverage brewing device comprising a vessel for liquid to be infused, said vessel having a top opening formed therein, and a cover assembly disposed in said opening and serving as a basket for brewmaking ingredients, said assembly comprising a container having an imperforate tubular wall and a wall closing the upper end thereof, and
a removable imperforate closure member disposed for closing the lower end of said tubular wall,
said closure member having
an inlet formed therein for permitting entry of liquid into said assembly, and
outlet means provided in said cover assembly for discharging infused liquid therefrom;
said container being adapted to receive brewmaking ingredients when in the inverted position, with said upper end lowermost, and said container substantially closing said top opening in said vessel when positioned upright therein.

8. The structure of claim 7 wherein said outlet means comprises
a plurality of clearance openings provided between the periphery of said closure member and said tubular wall.

References Cited in the file of this patent

UNITED STATES PATENTS

| | | |
|---|---|---|
| 1,007,725 | Nelson | Nov. 7, 1911 |
| 2,798,143 | O'Brien | July 2, 1957 |
| 3,011,428 | Kircher | Dec. 5, 1961 |